(12) United States Patent
Im

(10) Patent No.: US 11,731,553 B2
(45) Date of Patent: Aug. 22, 2023

(54) AUTOMATIC SAFETY TRIPOD FOR VEHICLE

(71) Applicant: INDURAS, iNC, Busan (KR)

(72) Inventor: Byung Aun Im, Busan (KR)

(73) Assignee: INDURAS, iNC, Busan (KR)

( * ) Notice: Subject to any disclaimer, the term of this patent is extended or adjusted under 35 U.S.C. 154(b) by 0 days.

(21) Appl. No.: 17/618,424

(22) PCT Filed: Jun. 18, 2020

(86) PCT No.: PCT/KR2020/007891
§ 371 (c)(1),
(2) Date: Dec. 10, 2021

(87) PCT Pub. No.: WO2020/262883
PCT Pub. Date: Dec. 30, 2020

(65) Prior Publication Data
US 2022/0250538 A1 Aug. 11, 2022

(30) Foreign Application Priority Data
Jun. 28, 2019 (KR) .................. 10-2019-0077913

(51) Int. Cl.
*B60Q 1/52* (2006.01)
*B60Q 1/30* (2006.01)
*G09F 13/00* (2006.01)

(52) U.S. Cl.
CPC .................. *B60Q 1/52* (2013.01); *B60Q 1/30* (2013.01); *G09F 13/005* (2013.01)

(58) Field of Classification Search
CPC .......... B60Q 1/52; B60Q 1/30; B60Q 1/2692; B60Q 1/503; B60Q 7/00; B60Q 1/2696; B60Q 2300/43; G09F 13/005; F16H 21/44; F16H 1/20; F16H 21/12
See application file for complete search history.

(56) References Cited

U.S. PATENT DOCUMENTS

| 11,382,422 | B1* | 7/2022 | Gatski | A47F 5/0892 |
| 2019/0047327 | A1 | 2/2019 | Petrucelli | |
| 2023/0010589 | A1* | 1/2023 | Eikelenboom | H02S 30/10 |
| 2023/0043010 | A1* | 2/2023 | Kaplan | A47G 33/12 |

FOREIGN PATENT DOCUMENTS

| KR | 20050054179 A | 6/2005 |
| KR | 101251037 B1 | 4/2013 |
| KR | 20180031563 A | 3/2018 |
| WO | 2018038521 A1 | 3/2018 |

* cited by examiner

*Primary Examiner* — Daryl C Pope
(74) *Attorney, Agent, or Firm* — Bayramoglu Law Offices LLC

(57) ABSTRACT

An automatic safety tripod for a vehicle includes a frame formed in a housing with one open surface, and a display part of which one portion is connected to the frame, the display part being folded or unfolded to be inserted into or protrude out of the frame. The frame includes a rotation bar in the frame, and having screw threads at opposite ends thereof, the screw threads being screwed to one side of the frame, a motor provided at the center of the rotation bar and rotating the rotation bar; pulleys provided at opposite sides of the rotation bar based on the center portion, and a wire of which a first portion is connected to each of the pulleys and a second portion is connected to the display part, the wire moving the frame by rotation of the pulley.

3 Claims, 11 Drawing Sheets

AUTOMATIC SAFETY TRIPOD FOR VEHICLE

CROSS REFERENCE TO THE RELATED APPLICATIONS

This application is the national phase entry of International Application No. PCT/KR2020/007891, filed on Jun. 18, 2020, which is based upon and claims priority to Korean Patent Application No. 10-2019-0077913, filed on Jun. 28, 2019, the entire contents of which are incorporated herein by reference.

TECHNICAL FIELD

The present disclosure relates to an automatic safety tripod for a vehicle.

BACKGROUND

In general, while driving a car, not only safety accidents but also emergency situations that are not related to the intention of a driver frequently occur. In order to protect the driver and passengers from the accidents and to inform the driver and the passengers of the emergency situation, it is stipulated by law that a safety tripod for a vehicle is mandatory.

The safety tripod for a vehicle is manufactured in a triangular shape in accordance with relevant law and regulation, and is manufactured by attaching a light reflecting plate or a reflecting film on a surface to reduce a unit cost. In article 40 of the enforcement rule of the road traffic act, it is stipulated that a safety tripod is installed at a distance of 100 m or more from a broken or accident vehicle on a highway or an exclusive road for automobiles.

However, in setting up the conventional safety tripod, it is difficult to quickly setting up the safety tripod due to time consuming for releasing a support and putting the tripod together. Therefore, a driver is reluctant to set up a safety tripod, and secondary accidents due to the time consuming for setting the safety tripod and secondary traffic accidents due to non-setting of the safety tripod may increase. Furthermore, the conventional safety tripod for a vehicle is formed in a fixedly-formed triangular shape and may have a problem of reducing storage performance of a storage space of a vehicle.

SUMMARY

Accordingly, the present disclosure is intended to provide an automatic safety tripod configured to be stored without a separate space while being foldable when being mounted and stored in a vehicle.

Another objective of the present disclosure is intended to provide an automatic safety tripod configured to be automatically unfolded at a rear end of a vehicle in an emergency situation while being mounted in the vehicle.

In order to achieve the above objective, according to one aspect of the present disclosure, there is provided an automatic safety tripod for a vehicle, the automatic safety tripod including: a frame formed in a housing with one open surface; and a display part of which one portion may be connected to the frame, the display part being configured to be folded to be inserted into the frame or to be unfolded to protrude out of the frame, wherein the frame may include: a rotation bar provided in the frame, and having screw threads at opposite ends thereof, the screw threads being screwed to one side of the frame; a motor provided at a center portion of the rotation bar and configured to rotate the rotation bar; pulleys respectively provided at opposite sides of the rotation bar based on the center portion; and a wire of which a first portion may be connected to each of the pulleys and a second portion may be connected to the display part, the wire being configured to move the frame by rotation of the pulley.

The display part may include: a first fixation bar having a first guide groove and a second guide groove, the first guide groove and the second guide groove being located at left and right portions of a side surface thereof; a second fixation bar located above the first fixation bar; a plurality of support plates having saw-toothed first ends, each of the saw-toothed first ends being rotatably coupled to each of the support plates and the supports plates located adjacent to each other being engaged by the saw-toothed first ends thereof, the plurality of support plates having second ends respectively connected to the screw threads, the first guide groove, and the second guide groove, wherein the plurality of support plates may include: a first support bar and a second support bar of which second portions are coupled to the screw threads, and configured to be moved along the screw threads; a third support bar of which a second portion may be coupled to the first guide groove, and configured to be moved along the first guide groove; and a fourth support bar of which a second portion may be coupled to the second guide groove, and configured to be moved along the second guide groove.

The display part may include: a plurality of LED lamps provided on one surface thereof, the automatic safety tripod further including: an operation part configured to generate an operation signal by manipulation of a user so as to operation a flashing mode of the display part; and a controller configured to receive the operation signal and to control flash of the plurality of LED lamps so as to make a plurality of patterns, wherein the plurality of patterns may include: an x-pattern made by flashing the first support bar, the second support bar, the third support bag, and the fourth support bar, a triangle pattern made by flashing the third support bag, the fourth support bar, and the first fixation bar, and left and right arrow patterns made by flashing the first support bar, the second support bar, the third support bag, the fourth support bar, and the second fixation bar.

According to the embodiments of the present disclosure, when the safety tripod is mounted and stored in the vehicle, the safety tripod is configured to be foldable, so that the safety tripod can be stored without occupying a large space.

According to the embodiments of the present disclosure, the safety tripod is provided in the vehicle and automatically unfolded from a rear end of the vehicle in an emergency situation, so that a following vehicle can recognize a sudden stop of the preceding vehicle and prevent an accident.

According to the embodiments of the present disclosure, in an emergency situation on a highway where vehicles are traveling at high speed, a user can safely set up the safety tripod while driving without getting off and turn on the LED lamps while setting up the safety tripod, so that the vehicle with the safety tripod can be easily identified even in environment where it is difficult to secure driving visibility at night and in fog.

BRIEF DESCRIPTION OF THE DRAWINGS

The above and other objectives, features, and other advantages of the present disclosure will be more clearly understood from the subsequent detailed description when taken in conjunction with the accompanying drawings, in which.

DESCRIPTION OF THE REFERENCE NUMERALS

Figure 1:
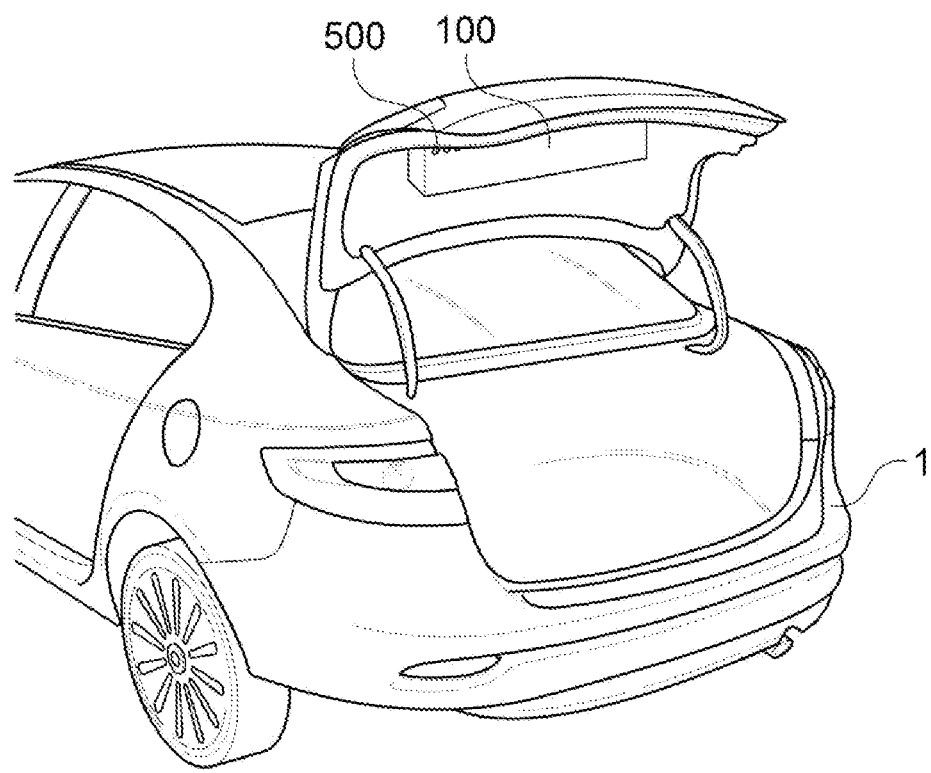
FIG. 1 is a concept view showing an automatic safety tripod according to an embodiment of the present disclosure.

100: frame
110: drive means
111: rotation bar
112: motor
113-1, 113-2: pulleys
114: wire
200: display part
210: first fixation bar
211: first guide groove
212: second guide groove
220: second fixation bar
221: third guide groove
231: first support bar
232: second support bar
233: third support bar
234: fourth support bar
235: support plate
236: coupling member
250: LED lamps
300: controller
400: communication part
500: operation part

DETAILED DESCRIPTION OF THE INVENTION

Hereinbelow, an exemplary embodiment of the present disclosure will be described with reference to accompanying drawings. The following detailed description of the present disclosure is presented to representative for purposes of helping more comprehensive understanding of the methods, devices, and systems described herein. However, this is only an example and the present disclosure is not limited thereto.

In the following description, it is to be noted that when the functions of conventional elements and the detailed description of elements related with the present disclosure may make the gist of the present disclosure unclear a detailed description of those elements will be omitted. Terms to be described later are defined in consideration of functions in the present disclosure, which may vary according to intentions or customs of users and operators. Therefore, the definition thereof should be made based on the content throughout this specification. The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

The relative terms such as "below", "above", "upper", "lower", "horizontal", and "vertical" may be used to describe a relationship between different members, layers, or regions in this specification. It should be collectively understood such that these terms mean directions marked in the drawings as well as directions of other devices.

Figure 2:
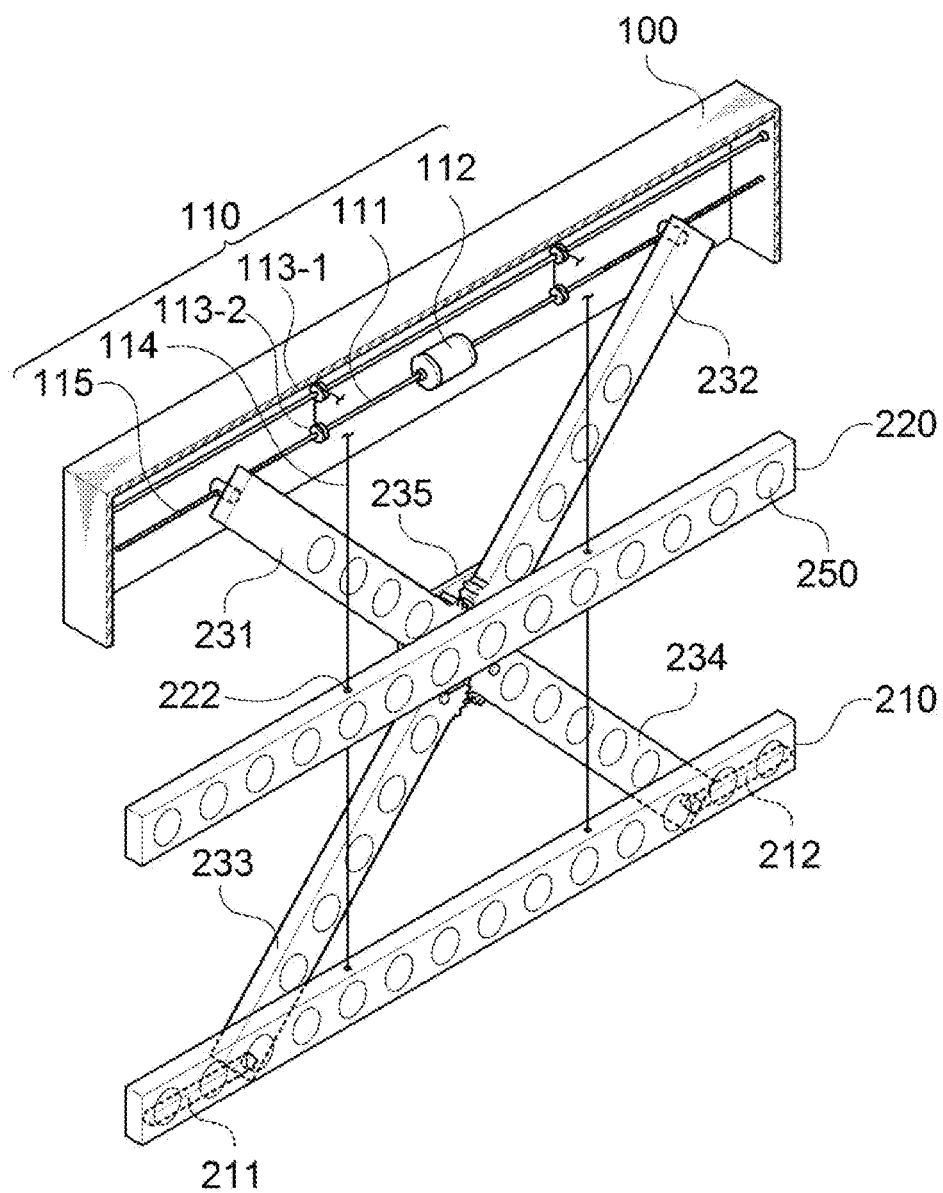
FIG. 2 is a perspective view showing the automatic safety tripod according to the embodiment of the present disclosure.
Figure 3A:
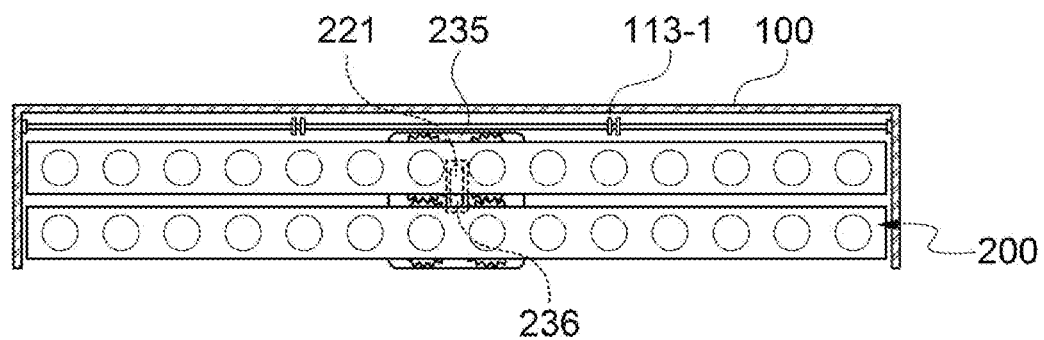
FIGS. 3A and 3B are sectional views showing a folded state and an unfolded state of the automatic safety tripod according to the embodiment of the present disclosure.
Figure 3B:
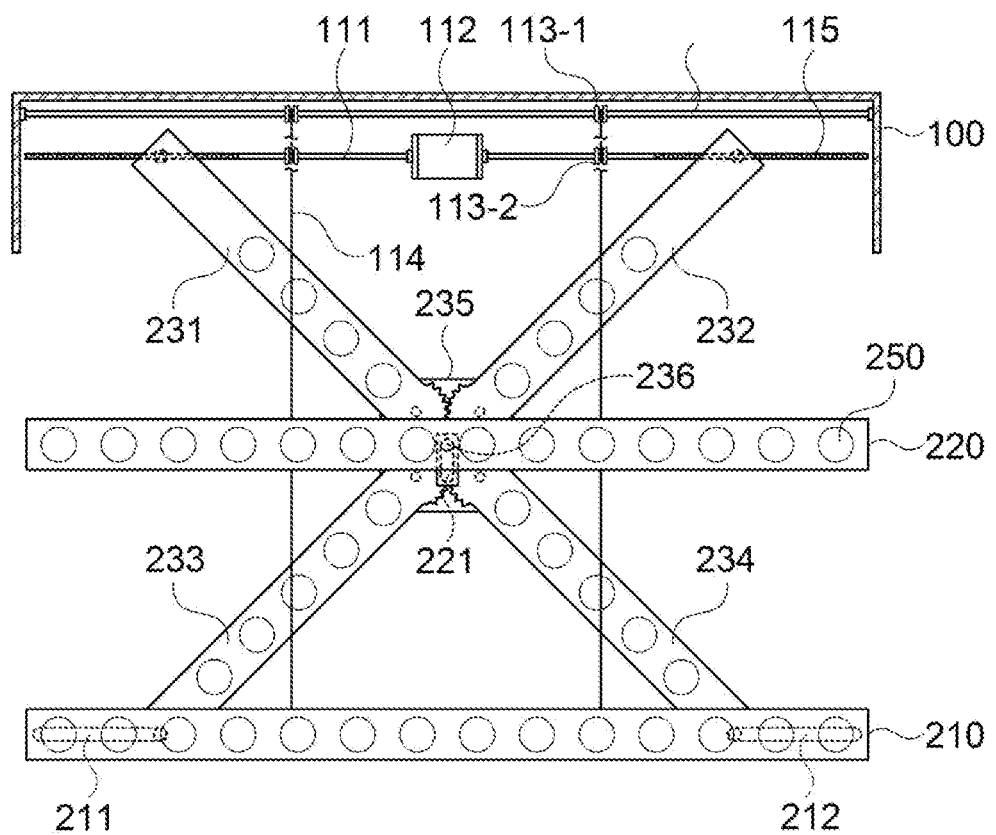
Figure 4:
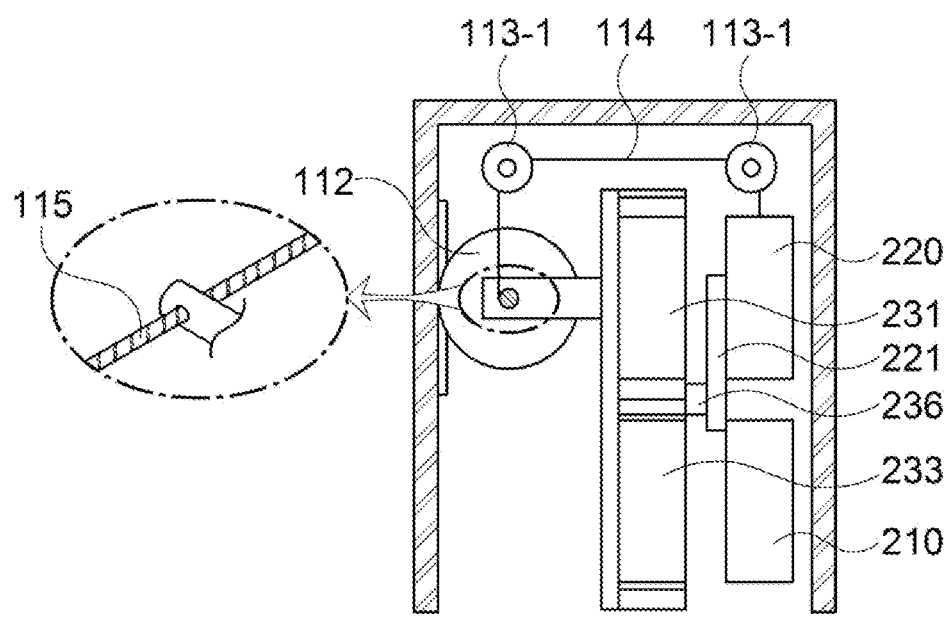
FIG. 4 is a side sectional view showing the automatic safety tripod according to the embodiment of the present disclosure.
Figure 5A:
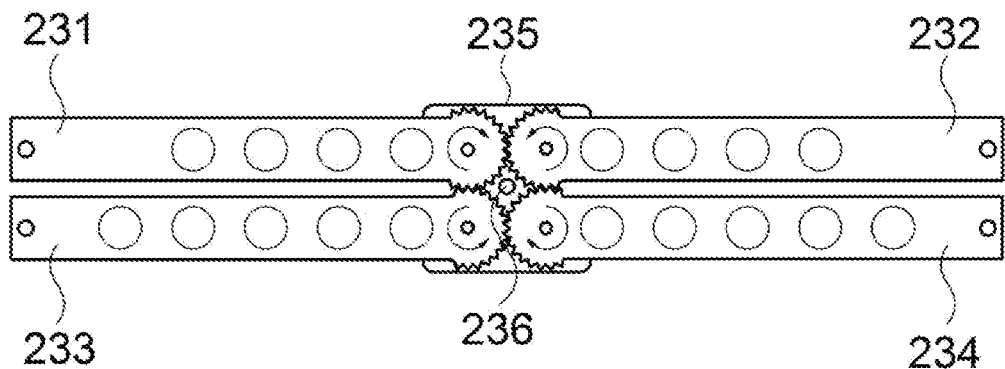
FIGS. 5A and 5B are sectional views showing operational states of a display part of the automatic safety tripod according to the embodiment of the present disclosure.
Figure 5B:
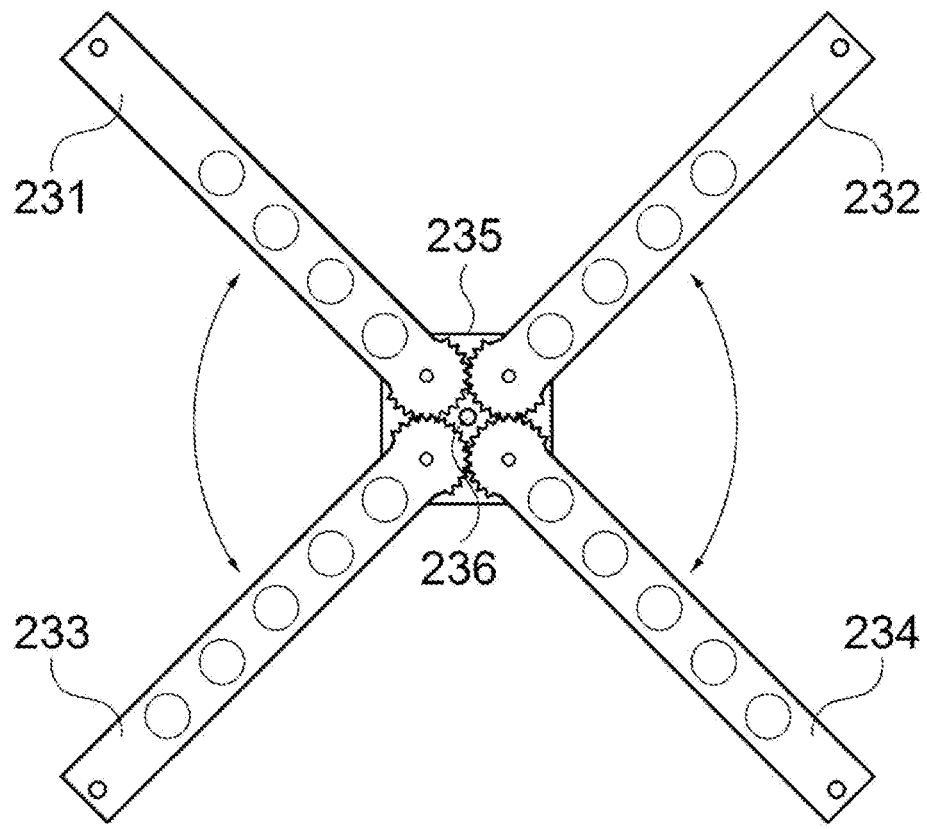
Figure 6A:
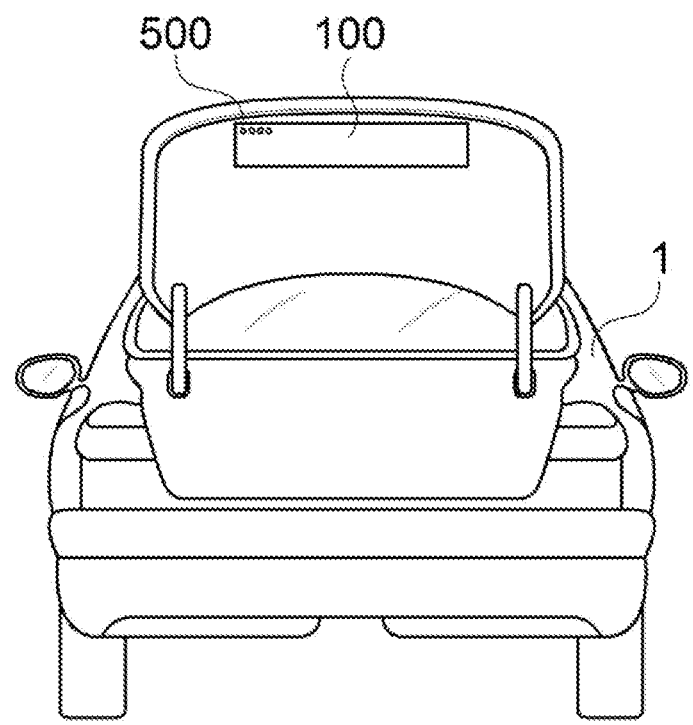
FIGS. 6A to 6C are views showing states of the automatic safety tripod mounted to a vehicle according to the embodiment of the present disclosure.
Figure 6B:
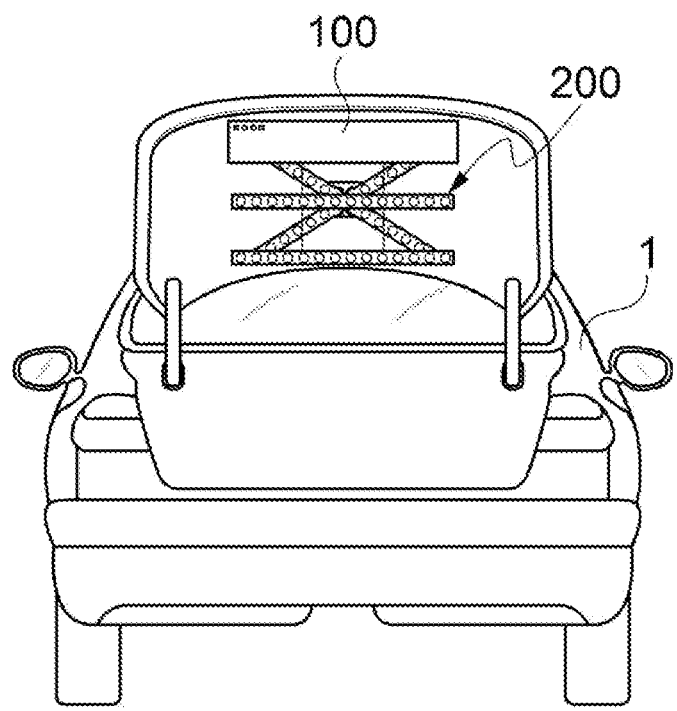
Figure 6C:
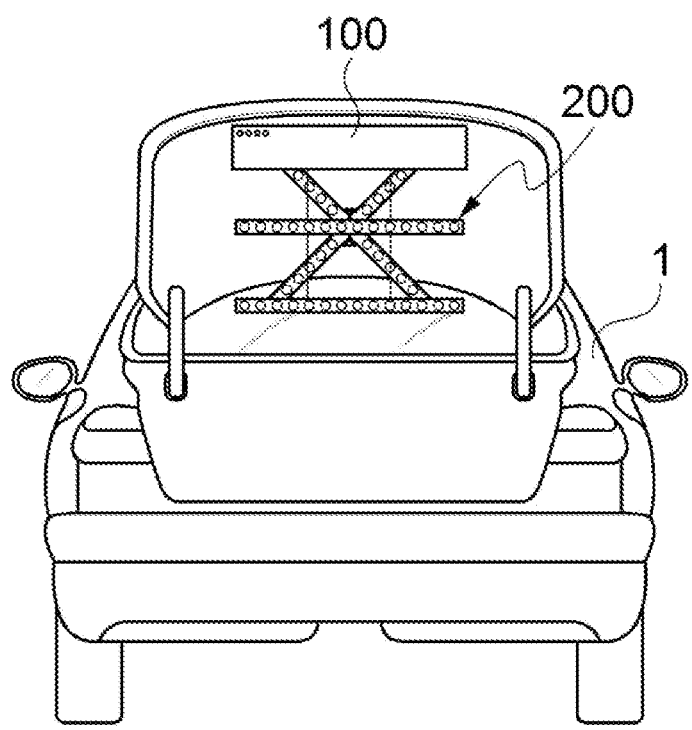

FIG. 1 is a concept view showing an automatic safety tripod according to an embodiment of the present disclosure. FIG. 2 is a perspective view showing the automatic safety tripod according to the embodiment of the present disclosure. FIGS. 3A and 3B are sectional views showing a folded state and an unfolded state of the automatic safety tripod according to the embodiment of the present disclosure. FIG. 4 is a side sectional view showing the automatic safety tripod according to the embodiment of the present disclosure. FIGS. 5A and 5B are sectional views showing operational states of a display part of the automatic safety tripod according to the embodiment of the present disclosure. FIGS. 6A to 6C are views showing states of the automatic safety tripod mounted to a vehicle according to the embodiment of the present disclosure.

As shown in FIGS. 1 to 6C, the automatic safety tripod according to the embodiment of the present disclosure may include a frame 100 and a display part 200.

The frame 100 may be formed in a long '⊂' shape with one open surface. The display part 200 may protrude from the one open surface of the frame 100. The frame 100 may include a magnet (not shown) therein. The frame 100 may be attached and detached to a portion (e.g., trunk) in a vehicle 1 by the magnet (not shown) provided in the frame 100.

The frame 100 may include a drive means 110 therein. The drive means 110 may operate folding and unfolding of the display part 200, may include a rotation bar 111, a motor 112, pulleys 113-1 and 113-2, and a wire 114.

The rotation bar 111 may be provided in the frame 100 and be formed in a round rod shape. The rotation bar 111 may have screw threads 115 at opposite ends thereof. The screw threads 115 at opposite ends of the rotation bar 111 are coupled to a first support bar 231 and a second support bar 232. As the rotation bar 111 is rotated, the first support bar 231 and the second support bar 232 are rotated and moved along the screw threads 115 thus the display part 200 may be folded or unfolded.

The motor 112 may be provided at a center portion of the rotation bar 111 and may rotate the rotation bar 111. For example, the motor 112 may be a through-type motor provided to rotate the rotation bar 111 while being located at the center portion the rotation bar 111. The rotation bar 111 coupled to the motor 112 may be rotated by a rotary force of the motor 112.

The pulleys 113-1 and 113-2 may be respectively provided in the frame 100 and at the rotation bar 111. The pulleys 113-1 provided at the inside portions of the frame 100 may allow the wire 114 to be efficiently released or wound. Furthermore, the pulleys 113-2 located at the rotation bar 111 may be coupled to the rotation bar 111 and be rotated by rotation of the rotation bar 111 so as to release or wind the wire 114. The pulleys 113-2 may be provided at opposite portions beside the motor 112 of the rotation bar 111. A second portion of the wire 114 may be connected to each of the pulleys 113-2 provided at the opposite portions of the motor 112. A first portion of the wire 114 may be connected to the first fixation bar 210 and a second portion of the wire 114 may be connected to each of the pulleys 113-2. The wire 114 may be wound or released by rotation of the pulleys 113-2. Therefore, as the wire 114 connected to each of the pulleys 113-2 is wound or released by rotation of the motor 112, the display part 200 may be folded or unfolded.

Meanwhile, in the embodiment, it is shown that four pulleys are included in the frame 100, but the present disclosure is not limited thereto, and two pulleys may be included in the frame 100.

Furthermore, the frame 100 may be formed in a cover (not shown) of which a part of a front surface is transparent in order to prevent the frame 100 from blocking the display part 200, for example, the frame 100 may be made of a material such as acrylic, plastic, etc.

The display part 200 may be folded to be inserted into the frame 100 as a first portion thereof is coupled to the frame 100. The display part 200 may include the first fixation bar 210, a second fixation bar 220, the first support bar 231, the second support bar 232, a third support bag 233, and a fourth support bar 234.

The first fixation bar 210 may include a pair of first and second guide grooves 211 and 212 at left and right side portions thereof. The third support bag 233 may be connected to the first guide groove 211. The fourth support bar 234 may be connected to the second guide groove 212. The first fixation bar 210 may be connected to the wire 114 and moved in vertical directions in response to winding or releasing of the wire 114.

The second fixation bar 220 may be provided above the first fixation bar 210. A third guide groove 221 may be provided at a rear center portion of the second fixation bar 220, and a coupling member 236 of a support plate 235 slides along the third guide groove 221. The third guide groove 221 may be formed downwardly longer than the height of the second fixation bar 220. When the display part 200 is folded, the coupling member 236 is moved downward along the third guide groove 221 and the first fixation bar 210 and the second fixation bar 220 may be fully inserted into the frame 100.

Furthermore, the second fixation bar 220 may have a hole 222 through which the wire 114 passes. The second fixation bar 220 may maintain a straight shape ('-' shape) thereof by the coupling member 236 and the wire 113, and may maintain a parallel shape ('=' shape) by being maintained in parallel to the first fixation bar 210.

Each of the first support bar 231, the second support bar 232, the third support bag 233, and the fourth support bar 234 may be formed in a bar shape with one saw-toothed end. The first support bar 231, the second support bar 232, the third support bag 233, and the fourth support bar 234 may be rotatably coupled to the support plate 235 so that the one portion of one of the support bars is coupled to other support bars close to the support bar. The support plate 235 may include the coupling member 236. The coupling member 236 may be coupled to the third guide groove 221 of the second fixation bar 220 and slide along the third guide groove 221. The first support bar 231 and the second support bar 232 may be respectively coupled, at second portions thereof, to the screw threads 115 of the rotation bar 111, and may be rotated by rotation of the rotation bar 111. The third support bag 233 and the fourth support bar 234 may be respectively coupled, at second portions thereof, to the first guide groove 211 and the second guide groove 212, and may slide along the first and second guide grooves 211 and 212.

When the display part 200 is unfolded, the first support bar 231, the second support bar 232, the third support bag 233, and the fourth support bar 234 may make an X-shape by saw-toothed portions thereof that are engaged with other support bars close to each other.

As the rotation bar 111 is rotated by the motor 112, the first fixation bar 210 of the display part 200 connected to the wire 114 may be moved. In addition, as the first support bar 231 and the second support bar 232 connected to the screw threads 115 are moved, the first support bar 231, the second support bar 232, the third support bag 233, and the fourth support bar 234 of the display part 200, which are in a toothed-engaged state, may be unfolded or folded by a toothed-wheel mechanism.

Furthermore, the display part 200 may include a plurality of LED lamps 250 on one surface. While the display part 200 is unfolded, the plurality of LED lamps 250 may be used to make a plurality of patterns. The plurality of LED lamps 250 may make the plurality of patterns under control of a controller 300. Furthermore, the plurality of LED lamps 250 may make the plurality of patterns by an operation part 500. The plurality of patterns may include an X-shaped pattern made by flashing the first support bar 231, the second support bar 232, the third support bag 233, and a triangle pattern made by flashing the fourth support bar 234, the third support bag 233, the fourth support bar 234, and the first fixation bar 210, and left and right arrow patterns made by flashing the first support bar 231, the second support bar 232, the third support bag 233, the fourth support bar 234, and the second fixation bar 220.

As described above, as the display part 200 makes the X-shaped pattern, the triangle pattern, the left and right arrow patterns, etc. by using the plurality of LED lamps 250, the vehicle with the display part 200 may display emergency situations of the vehicle. The plurality of LED lamps 250 may be powered using a power line using a battery of the vehicle 1 or an inner battery. The inner battery (not shown) may be configured to be normally charged from the battery of the vehicle 1.

Meanwhile, in the embodiment, the first fixation bar 210 is shown as a coupled state, but the present disclosure is not limited thereto. The first fixation bar 210 may be removably coupled to the third support bag 233 and the fourth support bar 234, and may be used even in a separated state. For example, the first fixation bar 210 separated from the display part 200 may be formed in a rod shape, thereby being used as a rod-shaped emergency exit light.

As a result, as shown in FIGS. 6A to 6C, the automatic safety tripod of the present disclosure may be automatically unfolded or folded.

Figure 7:
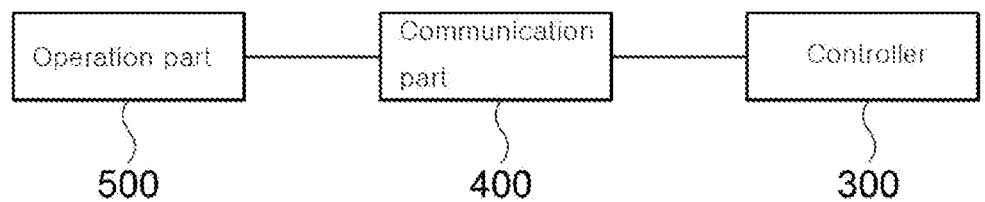
FIG. 7 is a block diagram operating the display part of the automatic safety tripod according to the embodiment of the present disclosure.
Figure 8A:
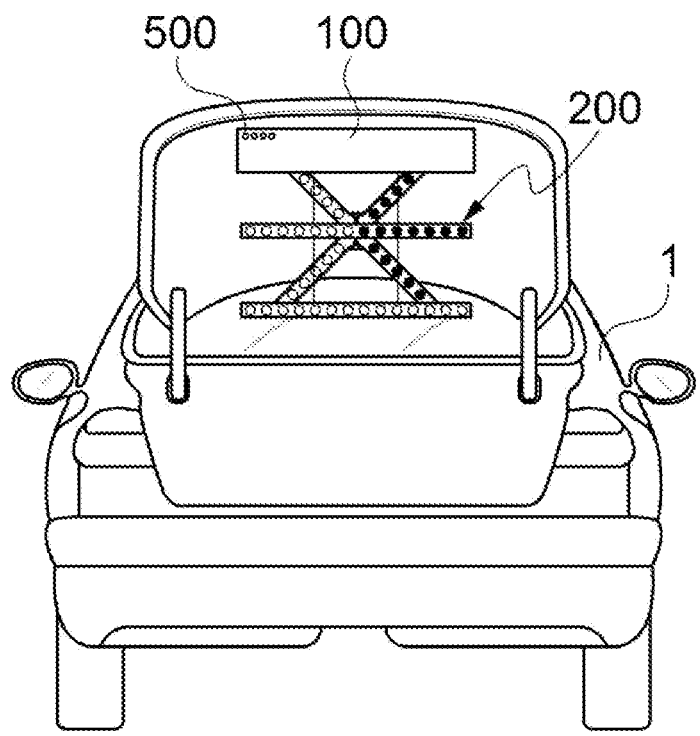
FIGS. 8A to 8D are views showing operations of the display part of the automatic safety tripod according to the embodiment of the present disclosure.
Figure 8B:
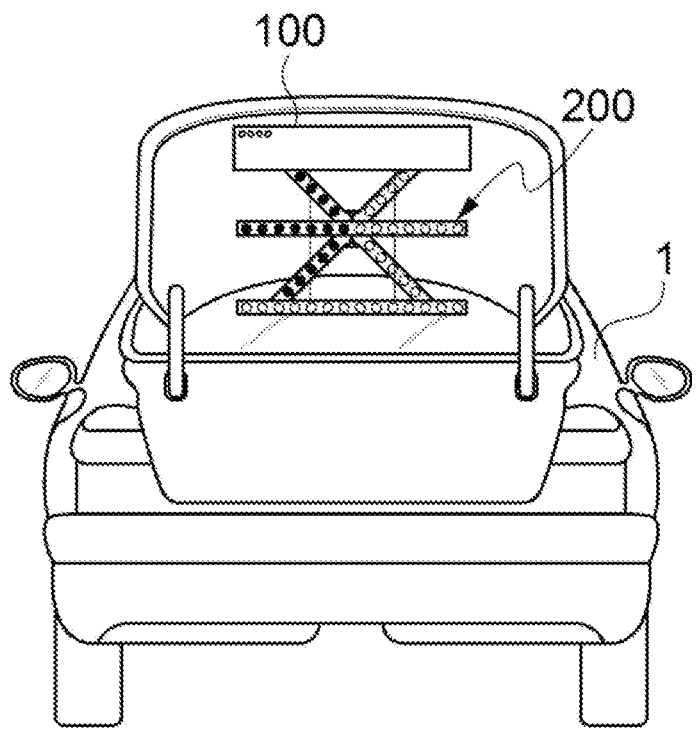
Figure 8C:
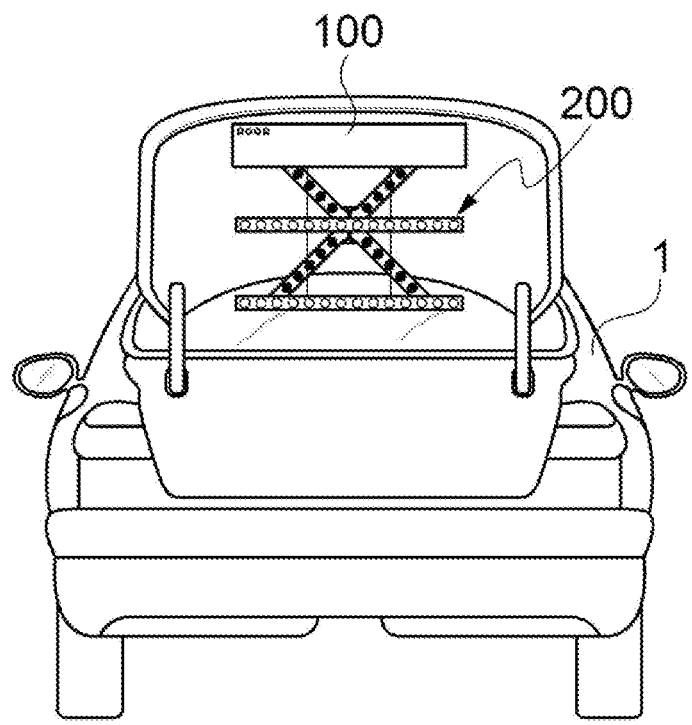
Figure 8D:
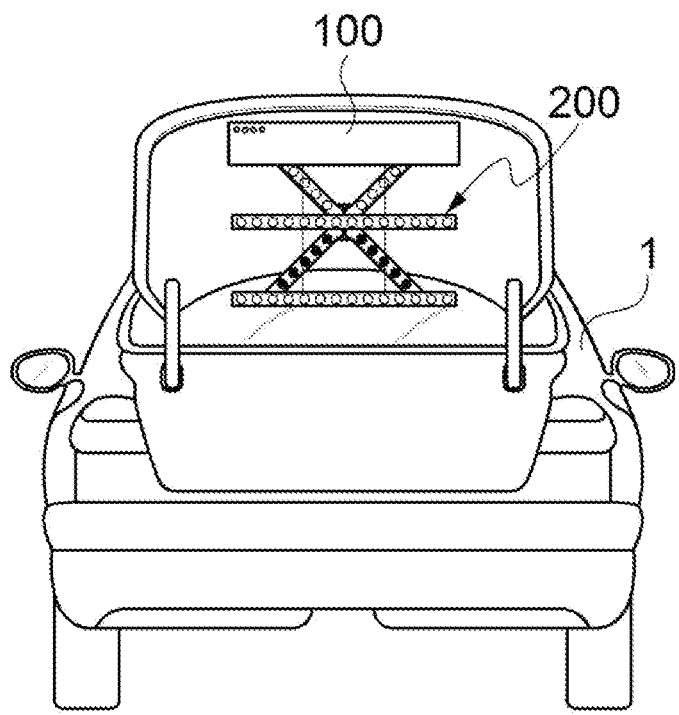

FIG. 7 is a block diagram operating the display part of the automatic safety tripod according to the embodiment of the present disclosure.

As shown in FIG. 7, the automatic safety tripod according to the embodiment of the present disclosure may include the controller 300, a communication part 400, and the operation part 500.

The controller 300 may be operationally connected to an emergency light or a shock detection unit of the vehicle 1 and control the display part 200. When the emergency light of the vehicle 1 remains for a certain period of time or the shock detection unit transmits a shock detection signal, the controller 300 may operate the display part 200. The controller 300 may turn on the plurality of LED lamps 250 of the display part 200.

Furthermore, the controller 300 may receive the operation signal of the operation part 500 from the communication part 400 and control the display part 200. The controller 300 may receive the operation signal of the operation part 500 and turn on the plurality of LED lamps 250 to make the triangle shape, X-shape, left and right arrowed shapes, etc.

The controller 300 may control the plurality of LED lamps 250 to make the plurality of patterns to induce a lane change to a vehicle behind.

FIGS. 8A to 8D are views showing operations of the display part of the automatic safety tripod according to the embodiment of the present disclosure.

As shown in FIGS. 8A to 8D, the display part 200 of the automatic safety tripod may make the plurality of patterns. The controller 300 may turn on the plurality of LED lamps 250 of the display part 200 to display the left and right shape, triangle shape, and X-shape.

For example, when the vehicle is stopped on a right side lane on a road, the plurality of LED lamps 250 may alternately flash in the X-shape and the left arrow shape so that an accident situation of the preceding vehicle is notified to a following vehicle and the following vehicle may be guided to change a lane. Furthermore, when the vehicle is stopped on a first lane on a road, the plurality of LED lamps 250 may alternately flash in the X-shape and the right arrow shape, so that an accident situation of the preceding vehicle may be notified to the following vehicle and the following vehicle may be guided to change a lane. Furthermore, the plurality of LED lamps 250 may alternately flash the X-shape and triangle shape, so that an accident situation of the preceding vehicle is notified to the following vehicle and may guide the following method to slow down.

Referring to FIG. 7, the communication part 400 may be provided in the frame 100. The communication part 400 may receive the operation signal of the operation part by the operation of the user. The communication part 400 may communicate with the operation part 500 wirelessly. The wireless communication may be realized by using a known communication method capable of transmitting a signal in a short distance such as Bluetooth®, Zigbee®, infra-red, etc.

Meanwhile, in the embodiment, it is shown that the communication part 400 and the operation part 500 are connected to each other by the wireless communication, but the present disclosure is not limited thereto. In addition, the communication part 400 and the operation part 500 may be connected to each other by power supply line, signal transmission line, etc., in order to realize power supply and transmission of the operation signal.

The operation part 500 may generate the operation signal in order to control the display part 200 by operation of the user. The operation signal may receive a turning mode (e.g., flashing method, color change, brightness change, etc.), operation mode, etc. of the display part 200. The operation part 500 may be directly provided in the frame 100. Furthermore, the operation part 500 may be a remote control provided to remotely transmit the operation signal, and may be directly installed in the vehicle.

Therefore, the safety tripod may be provided in the vehicle and automatically unfolded at a rear end of the vehicle in an emergency situation, so that a following vehicle may recognize a sudden stop of the preceding vehicle and avoid an accident.

Furthermore, in an emergency situation on a highway where vehicles are traveling at high speed, a user can safely set up the safety tripod while driving without getting off. As the LED lamps are turned on while setting up the safety tripod, the vehicle with tripod may be easily identified even in environment where it is difficult to secure driving visibility at night and in fog.

Figure 9:
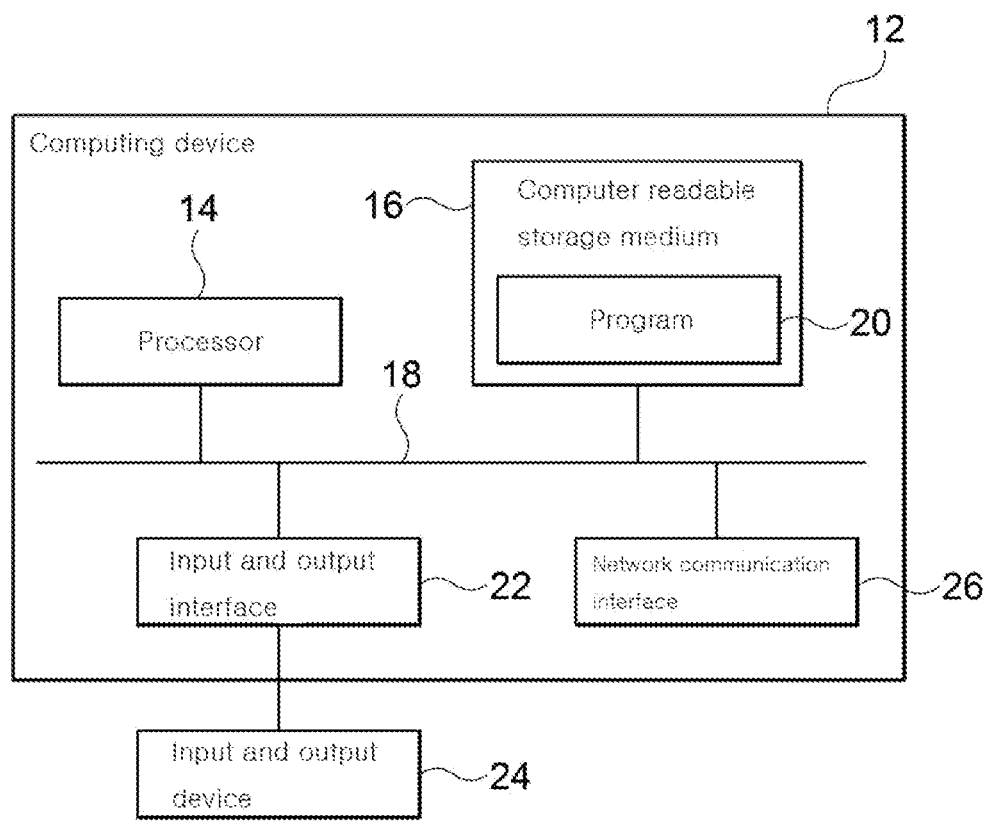
FIG. 9 is a block diagram showing computing environment including a computing device suitable for use in exemplary embodiments.

FIG. 9 is a block diagram showing computing environment including a computing device suitable for use in exemplary embodiments. In the embodiment shown in FIG. 9, each component may have different function and ability other than those described below, and the present disclosure may include additional components in addition to those described below.

Computing environment 10 shown in the drawing includes a computing device 12. In the embodiment, the computing device 12 may be the controller 300. Furthermore, the computing device 12 may be the operation part 500.

The computing device 12 may include at least one processor 14, one computer readable storage medium 16, and one communication bus 18. The processor 14 may allow the computing device 12 to be operated according to the above-described exemplary embodiment. For example, the processor 14 may execute at least one program stored in the computer readable storage medium 16. The at least one program may include at least one computer executable instruction. When the processor 14 executes the computer executable instruction, the computer executable instruction may allow the computing device 12 to execute the operations according to the exemplary embodiment.

The computer readable storage medium 16 may be configured to store computer executable instruction or a program code, and program data and/or other suitably formed information. The program 20 stored in the computer readable storage medium 16 may include a group of instructions executable by the processor 14. In the embodiment, the computer readable storage medium 16 may be a memory (non-volatile memory such as random access memory, volatile memory, or appropriate complex thereof), at least one magnetic disk storage device, optical disk storage devices, flash memory devices, differently formed storage medium capable of accessing and storing desired information by the computing device 12, or an appropriate complex thereof.

The communication bus 18 may relatively connect other various components of the computing device 12 to each other in addition to the processor 14, the computer readable storage medium 16.

The computing device 12 may include at least one input and output interface 22 that provides an interface for at least one input and output device 24 and at least one network communication interface 26. Both the input and output interface 22 and the network communication interface 26 are connected to the communication bus 18. The input and output device 24 may be connected to other components of the computing device 12 through the input and output interface 22. For example, the input and output device 24 may include a pointing device (mouse track pad, or the like), a keyboard, a touchable input device (touch pad, touch screen, or the like), a voice or sound input device, various types of sensor devices and/or input devices such as a capturing device, and/or an output device such as a display device, a printer, a speaker, and/or a network card. For example, the input and output device 24 may be included in the computing device 12 as one component constituting the computing device 12, and may be connected to the computing device 12 as a separate device from the computing device 12.

Although the preferred embodiment of the present disclosure has been disclosed for illustrative purposes, those skilled in the art will appreciate that various modifications, additions and substitutions are possible, without departing from the scope and spirit of the present disclosure as disclosed in the accompanying claims. It is thus well known to those skilled in that art that the present disclosure is not limited to the embodiment disclosed in the detailed description, and the patent right of the present disclosure should be defined by the scope and spirit of the present disclosure as disclosed in the accompanying claims. Accordingly, it should be understood that the present disclosure includes various modifications, additions and substitutions without departing from the scope and spirit of the present disclosure as disclosed in the accompanying claims.

What is claimed is:

1. An automatic safety tripod for a vehicle, comprising:
   a frame formed in a housing with one open surface; and
   a display part, wherein one portion of the display part being is connected to the frame, the display part is configured to be folded to be inserted into the frame or to be unfolded to protrude out of the frame,
   wherein the frame comprises:
   a rotation bar provided in the frame, wherein opposite ends of the rotation bar have screw threads, and the screw threads are screwed to one side of the frame;
   a motor provided at a center portion of the rotation bar and configured to rotate the rotation bar;
   pulleys respectively provided at opposite sides of the rotation bar based on the center portion; and
   a wire, wherein a first portion of the wire is connected to each of the pulleys, a second portion of the wire is connected to the display part, and the wire is configured to move the frame by rotation of the pulley.

2. The automatic safety tripod of claim 1, wherein the display part comprises:
   a first fixation bar having a first guide groove and a second guide groove, wherein the first guide groove and the second guide groove are located at left and right portions of a side surface of the display part;
   a second fixation bar located above the first fixation bar;
   a plurality of support plates having saw-toothed first ends, wherein each of the saw-toothed first ends is rotatably coupled to each of the plurality of support plates, supports plates located adjacent to each other are engaged by the saw-toothed first ends, and the plurality of support plates having have second ends respectively connected to the screw threads, the first guide groove, and the second guide groove,
   wherein the plurality of support plates comprises:
   a first support bar and a second support bar, wherein second portions of the first support bar and the second support bar are coupled to the screw threads, and configured to be moved along the screw threads;
   a third support bar, wherein a second portion of the third support bar is coupled to the first guide groove, and configured to be moved along the first guide groove; and
   a fourth support bar, wherein a second portion of the fourth support bar is coupled to the second guide groove, and configured to be moved along the second guide groove.

3. The automatic safety tripod of claim 2, wherein the display part comprises:
   a plurality of LED lamps provided on one surface of the display part;
   the automatic safety tripod further comprises:
   an operation part configured to generate an operation signal by manipulation of a user so as to operation a flashing mode of the display part; and
   a controller configured to receive the operation signal and to control flash of the plurality of LED lamps so as to make a plurality of patterns;
   wherein the plurality of patterns comprises:
   an x-pattern made by flashing the first support bar, the second support bar, the third support bar, and the fourth support bar,
   a triangle pattern made by flashing the third support bar, the fourth support bar, and the first fixation bar, and
   left and right arrow patterns made by flashing the first support bar, the second support bar, the third support bar, the fourth support bar, and the second fixation bar.

* * * * *